(12) United States Patent
Shows

(10) Patent No.: US 9,715,415 B2
(45) Date of Patent: *Jul. 25, 2017

(54) METHOD OF SCHEDULING THREADS FOR EXECUTION ON MULTIPLE PROCESSORS WITHIN AN INFORMATION HANDLING SYSTEM

(71) Applicant: DELL PRODUCTS, L.P., Round Rock, TX (US)

(72) Inventor: Thomas Alexander Shows, Leander, TX (US)

(73) Assignee: Dell Products, L.P., Round Rock, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/149,056

(22) Filed: May 6, 2016

(65) Prior Publication Data
US 2016/0253217 A1 Sep. 1, 2016

Related U.S. Application Data

(63) Continuation of application No. 13/931,005, filed on Jun. 28, 2013, now Pat. No. 9,342,374.

(51) Int. Cl.
*G06F 9/46* (2006.01)
*G06F 9/50* (2006.01)

(52) U.S. Cl.
CPC .... *G06F 9/5088* (2013.01); *G06F 2209/5022* (2013.01)

(58) Field of Classification Search
None
See application file for complete search history.

(56) References Cited

U.S. PATENT DOCUMENTS

| 6,549,930 | B1 | 4/2003 | Chrysos et al. |
| 9,342,374 | B2 | 5/2016 | Shows |
| 2011/0055838 | A1 | 3/2011 | Moyes |
| 2014/0129808 | A1 | 5/2014 | Naveh et al. |

*Primary Examiner* — Tammy Lee
(74) *Attorney, Agent, or Firm* — Isidore PLLC

(57) ABSTRACT

A method for improving thread execution speed within a multi-processor system includes a first processor and a second processor. The first processor generates threads to schedule for execution on the processors and initially assigns at least one thread to the first processor for execution on a core of the first processor. The first processor determines a core utilization rate for each of the threads and identifies whether the threads being scheduled have a core utilization rate greater than a pre-established core utilization rate threshold. In response to identifying a specific thread executing on the first processor that has a core utilization rate that is greater than the pre-established core utilization rate threshold, the first processor re-assigns execution of the specific thread from the first processor to the second processor. The re-assigned thread executes on the second processor at a greater execution rate than the pre-established core utilization rate threshold.

20 Claims, 7 Drawing Sheets

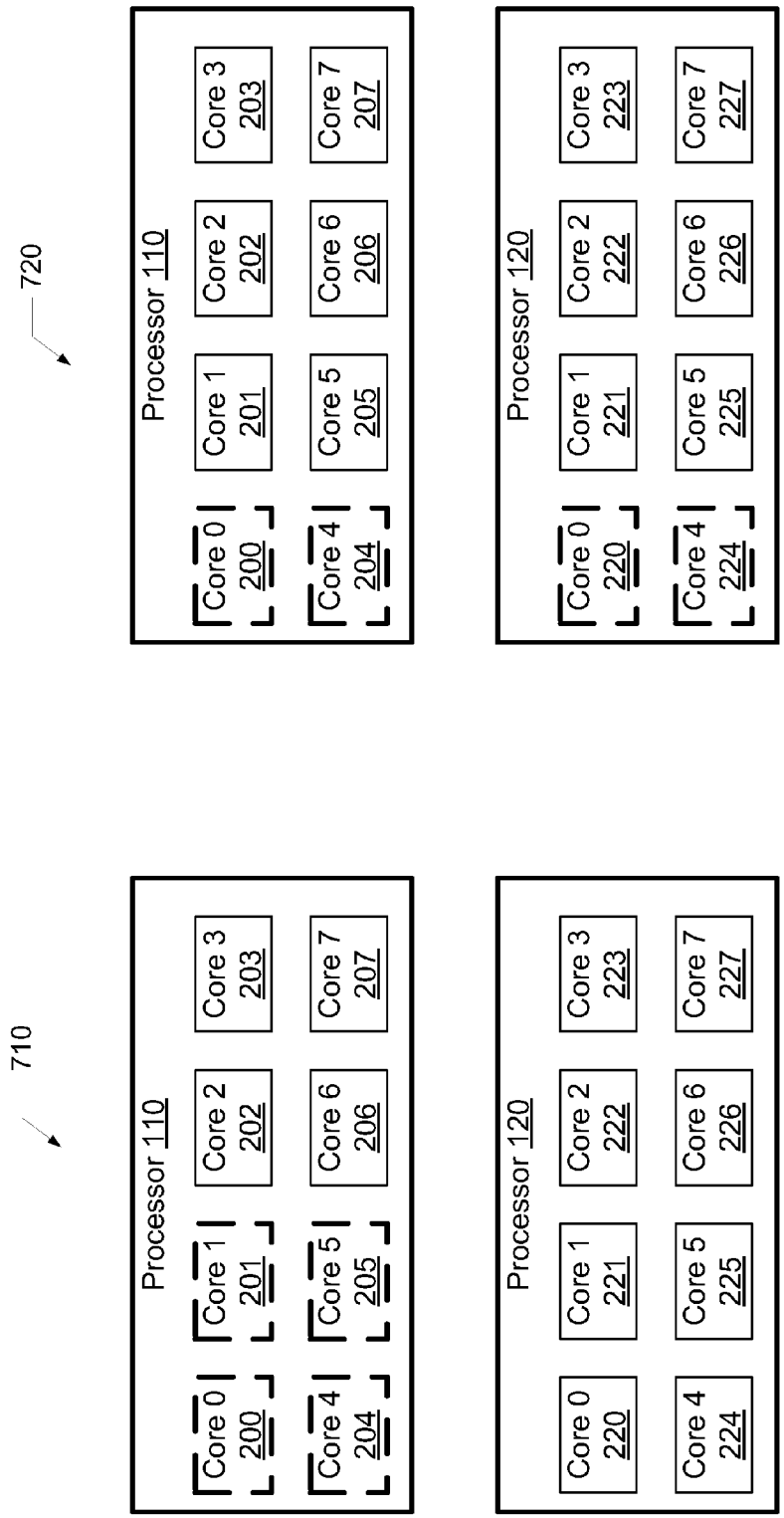

METHOD OF SCHEDULING THREADS FOR EXECUTION ON MULTIPLE PROCESSORS WITHIN AN INFORMATION HANDLING SYSTEM

RELATED APPLICATIONS

This application is a continuation of U.S. patent application Ser. No. 13/931,005 filed Jun. 28, 2013 entitled "Method of Scheduling Threads for Execution on Multiple Processors Within an Information Handling System", which is fully incorporated herein by reference.

BACKGROUND

1. Technical Field

The present disclosure generally relates to the operation of multiple processors within an information handling system, and in particular relates to improving thread scheduling and execution in a multi-processor system within an information handling system.

2. Description of the Related Art

As the value and use of information continue to increase, individuals and businesses seek additional ways to process and store information. One option available to users is information handling systems. An information handling system generally processes, compiles, stores, and/or communicates information or data for business, personal, or other purposes, thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

The information handling system can be designed with one or more physical processors that each have one or more cores. Each of the processors is a single computing component with one or more independent processor cores or cores, which are central processing units that are each able to read and execute program instructions or software code. The program instructions or software code can be regular computer instructions. The multiple processors can be mounted to a printed circuit board or backplane. The multiple cores can run multiple instructions at the same time, increasing the overall processing speed for programs. The multiple cores typically are integrated onto a single integrated circuit die or integrated circuit.

The operating system enables software applications to execute on the available hardware, and these software applications are comprised of program code packaged in an executable format, and these applications may create one or more threads which allow for parallel and sometimes synchronized execution of an applications code. The operating system includes a mechanism that responds to an application's request to create threads by allocating resources for the thread and enabling the thread's execution across the available cores. Threads can be assigned to a core based on a thread mask. The thread mask determines which cores that a thread may be assigned to. The threads can be assigned to alternating cores of an individual processor, for example to optimize performance when resources such as cache or fetch and execution units are shared between cores. This alternation scheme has shown to improve performance on processors which share resources between cores, for example Hyperthreading™ in certain Intel™ processors which split a core into two logical processors. Various processors support increased execution rates or frequencies, often referred to as turbo states, by dynamic adjustment of the processor frequency based upon workload. A processor that has only a few cores being utilized can operate at higher frequencies (clock rate) because of reduced power and cooling needs. A processor that has a majority of cores being utilized operates at lower frequencies because of increased power and cooling needs.

While the operating system can allocate threads for execution across various cores, unfortunately, the operating system does not distinguish between different individual processors that are mounted to separate sockets of a printed circuit board that are executing threads in a multi-socket system. The operating system may treat all of the available logical processors across all sockets as one large, contiguous bank of processors, and not take into account the algorithms used to adjust operating frequency of the processors grouped into one or more of the various sockets. The result of the operating system not distinguishing between different processors executing threads in a multi-processor system is that one processor can be operating at 100% utilization with a resulting low processing frequency, while another processor is essentially idle. A method for improving thread allocation across processors and thread execution speed in a multi-processor system is therefore needed.

BRIEF SUMMARY

Disclosed is a method for improving thread allocation across a multiprocessor system as well as overall thread execution (or processor execution) speed within a multi-processor system. The multiprocessor system includes at least a first processor on a first socket and a second processor on a second socket, each processor having a plurality of individual cores. A thread scheduler executing on the first processor generates threads to schedule for execution on the processors and the thread scheduler initially assigns at least one thread to the first processor for execution on a core of the first processor. The first processor determines a core utilization rate for each of the threads being scheduled and identifies whether any of the threads being scheduled have a core utilization rate greater than a pre-established core utilization rate threshold. In response to identifying a specific thread being assigned for execution on the first processor that has a core utilization rate that is greater than a pre-established core utilization rate threshold, the first processor re-assigns execution of the specific thread from the first processor to the second processor. The re-assigned thread is able to execute on the second processor at a greater execution rate than the pre-established core utilization rate threshold.

Also disclosed is an information handling system (IHS) that comprises a multi-processor system including a plurality of processors distributed across multiple sockets with each of the processors having a plurality of cores. A first processor on a first socket has firmware executing thereon to improve thread allocation and overall execution speed within the multi-processor system. The firmware configures the first processor to generate a plurality of threads to schedule for execution on the processors and initially assign at least one thread to the first processor for execution on a core of the first processor. The first processor determines a core utilization rate for each of the threads being scheduled and identifies whether any of the threads being scheduled have a core utilization rate greater than a pre-established core utilization rate threshold. In response to identifying a specific thread assigned to the first processor that has a core utilization rate that is greater than the pre-established core utilization rate threshold, the first processor re-assigns execution of the specific thread from the first processor to a second processor on a second socket that has less processing load. The re-assigned thread is able to execute on the second processor at a greater execution rate than the pre-established core utilization rate threshold.

The above summary contains simplifications, generalizations and omissions of detail and is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed written description.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which:

FIG. 7A illustrates an example of core utilization within a multi-socket, multi-processor system without the use of the thread optimizer module in the operating system; and FIG. 7B illustrates an example of core utilization within a multi-socket, multi-processor system using the thread optimizer module in the operating system.

DETAILED DESCRIPTION

Figure 1:
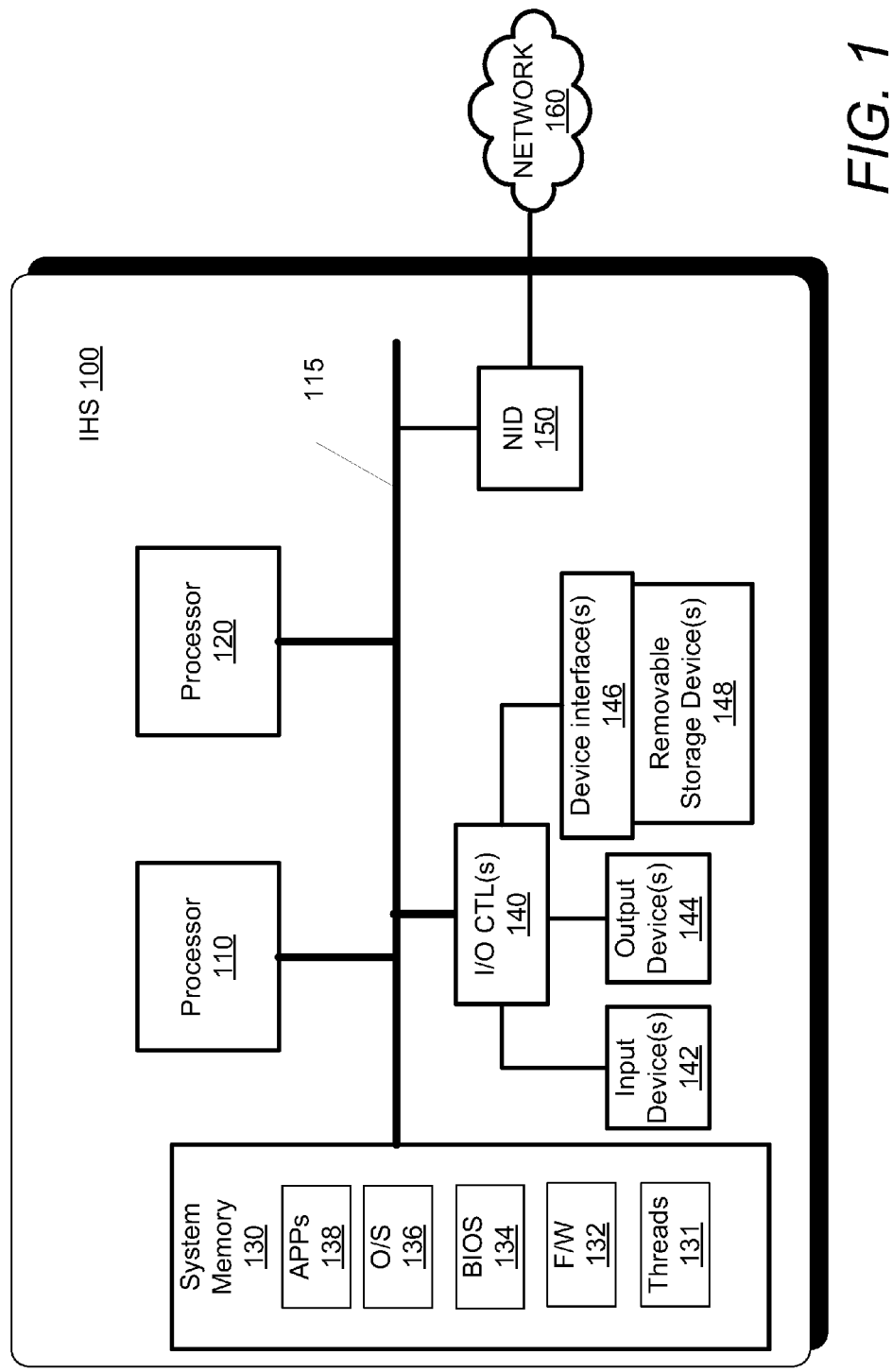
FIG. 1 illustrates an example information handling system within which various aspects of the disclosure can be implemented, according to one or more embodiments.

The illustrative embodiments provide an information handling system (IHS) and a method performed within the information handling system for (1) for improving thread allocation and overall thread execution speed within a multi-socket, multi-processor system, (2) enabling the re-assignment of specific threads from one processor on a first socket to another processor on a second socket that has less processing load and (3) providing execution of re-assigned threads at a greater execution rate.

In the following detailed description of exemplary embodiments of the disclosure, specific exemplary embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various requirements are described which may be requirements for some embodiments but not other embodiments.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that terms is utilized.

FIG. 1 illustrates a block diagram representation of an example information handling system (IHS) 100, within which one or more of the described features of the various embodiments of the disclosure can be implemented. For purposes of this disclosure, an information handling system, such as IHS 100, may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a handheld device, personal computer, a server, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Referring specifically to FIG. 1, example IHS 100 includes a multi-socket, multi-processor system including first processor 110 and second processor 120 coupled to system memory 130 via system interconnect 115. System interconnect 115 can be interchangeably referred to as a system bus, in one or more embodiments. System memory 130 can include therein a plurality of software and/or firmware modules including threads 131, firmware (F/W) 132, basic input/output system (BIOS) 134, operating system (O/S) 136, and application(s) 138. The one or more software and/or firmware modules within system memory 130 can be loaded into first processor 110 and/or second processor 120 during operation of IHS 100.

IHS 100 further includes one or more input/output (I/O) controllers 140 which support connection by, and processing of signals from, one or more connected input device(s) 142, such as a keyboard, mouse, touch screen, or microphone. I/O controllers 140 also support connection to and forwarding of output signals to one or more connected output devices 144, such as a monitor or display device or audio speaker(s). Additionally, in one or more embodiments, one or more device interface(s) 146, such as an optical reader, a universal serial bus (USB), a card reader, Personal Computer Memory Card International Association (PCMCIA) slot, and/or a high-definition multimedia interface (HDMI), can be associated with IHS 100. Device interface(s) 146 can be utilized to enable data to be read from or stored to corresponding removable storage device(s) 148, such as a compact disk (CD), digital video disk (DVD), flash drive, or flash memory card. Device interface(s) 146 can further include General Purpose I/O interfaces such as I²C, SMBus, and peripheral component interconnect (PCI) buses.

IHS 100 comprises a network interface device (NID) 150. NID 150 enables IHS 100 to communicate and/or interface with other devices, services, and components that are located external to IHS 100. These devices, services, and components can interface with IHS 100 via an external network, such as example network 160, using one or more communication protocols. Network 160 can be a local area network, wide area network, personal area network, and the like, and the connection to and/or between network 160 and IHS 100 can be wired or wireless or a combination thereof. For purposes of discussion, network 160 is indicated as a single collective component for simplicity. However, it is appreciated that network 160 can comprise one or more direct connections to other devices as well as a more complex set of interconnections as can exist within a wide area network, such as the Internet.

Those of ordinary skill in the art will appreciate that the hardware components and basic configuration depicted in FIG. 1 and other figures and described herein may vary. For example, the illustrative components within IHS 100 are not intended to be exhaustive, but rather are representative to highlight components that can be utilized to implement aspects of the present disclosure. For example, other devices/components may be used in addition to or in place of the hardware depicted. The depicted example does not convey or imply any architectural or other limitations with respect to the presently described embodiments and/or the general disclosure. In the discussion of each of the following figures, reference is also made to components illustrated in the preceding figures, for continuity of the description.

Figure 2:
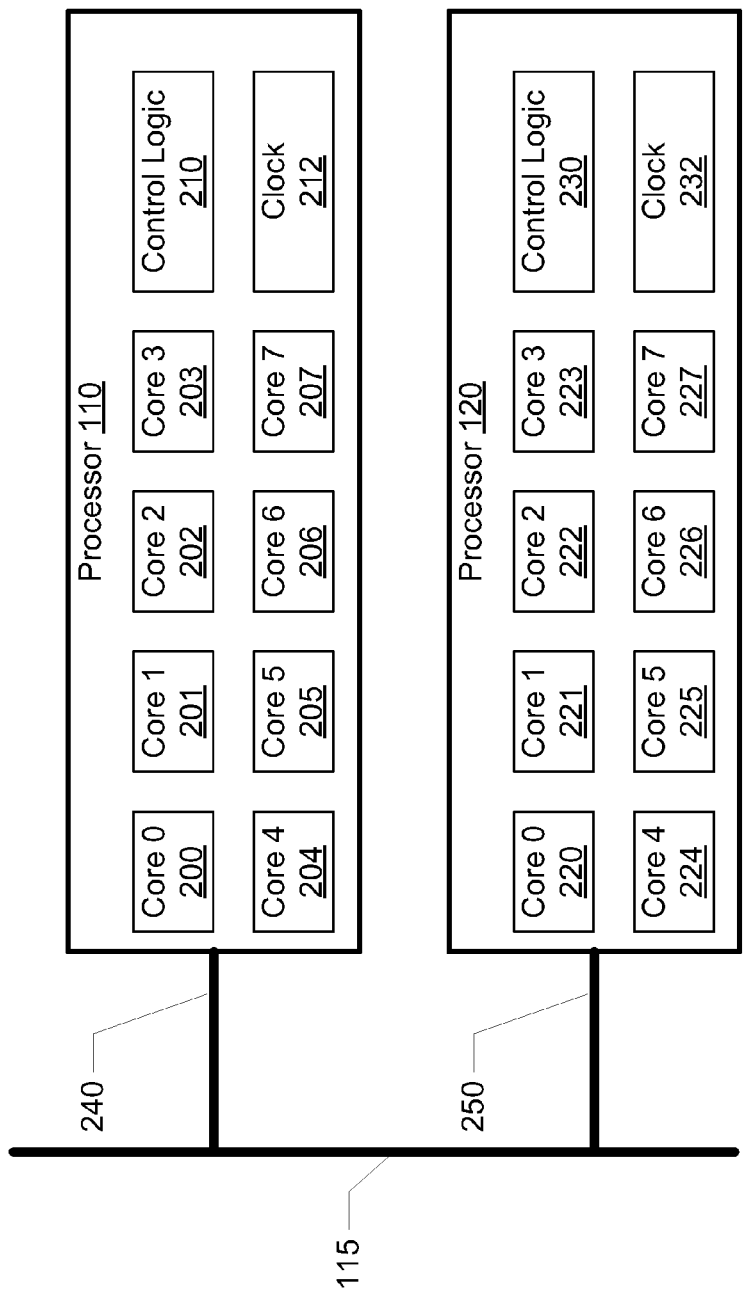
FIG. 2 illustrates an example of a multi-socket, multi-processor system having multiple cores within each processor of a first and a second socket, in accordance with one or more embodiments.

For purposes of the following description, and as explained further in FIG. 2, first processor 110 can be described as being on or belonging to a first socket, while second processor 120 can be described as being on or belonging to a second socket. It is appreciated that the number of sockets supported by the IHS 100 can vary. For example, the IHS 100 can be a 4-way, 8-way or even higher multi-socket system. Each socket has at least one processor, which includes multiple cores. And each core can be further divided by the system firmware into logical processors. With reference now to FIG. 2, there are illustrated further details of one embodiment of multi-core processors (i.e., first processor 110 and second processor 120) in a multi-socket processing system, such as IHS 100. In the illustration of FIG. 2, first processor 110 is provided on first socket 240, while second processor 120 is provided on second socket 250. It is appreciated that the illustration and description of a single processor for each of first socket 240 and second socket 250 provides a simplification that facilitates describing the functional aspects of the disclosure.

First processor 110 on first socket 240 includes several processor cores, including core 0 200, core 1 201, core 2 202, core 3 203, core 4 204, core 5 205, core 6 206 and core 7 207. First processor 110 also includes control logic 210 and clock 212. Cores 200-207 can communicate with each other and with control logic 210. Control logic 210 can control the operation of cores 200-207. According to one aspect of the described embodiments, control logic 210 can control the operating frequency and voltage or operating state of cores 200-207. Control logic 210 can also receive software and/or firmware modules from system memory 130 (FIG. 1) during the operation of first processor 110. In one embodiment, clock 212 is provided on first processor 110 and enables the generation of several different periodic frequency signals that can be applied to one or more of the cores 200-207 within first processor 110. Within the description, first processor 110 is also referred to interchangeably as primary processor 110, as described further below. Accordingly, within the description of the disclosure, the initial assignment of threads is assumed to be to cores 200-207 of first processor 110. Also, second processor 120 is assumed to be initially idle, but accessible for assignment of specific threads requiring turbo mode execution from among the set of threads being assigned to first processor 110. While second processor 120 can initially be idle, alternate embodiments allow for second processor 120 to have an assignment of less than a lower threshold number of threads, such that capacity for turbo state execution of threads exists on second processor 120.

Second processor 120 on second socket 250 also includes several processor cores, including core 0 220, core 1 221, core 2 222, core 3 223, core 4 224, core 5 225, core 6 226 and core 7 227. And, second processor 120 also includes control logic 230 and clock 232. Cores 220-227 can communicate with each other and with control logic 230. Control logic 230 can control the operation of cores 220-227. According to one aspect of the described embodiments, control logic 230 can control the operating frequency and voltage or operating state of cores 220-227. Control logic 230 can also receive software and/or firmware modules from system memory 130 (FIG. 1) during the operation of processor 120. In one embodiment, clock 232 is provided on second processor 120 and enables the generation of several different periodic frequency signals that can be applied to one or more of the cores 220-227 within second processor 120.

Operating frequencies that are higher than the minimum core operating frequency are referred to as turbo states. For example, if the normal or minimum core operating frequency is 2.0 GHz, control logic 210 can operate cores 200-207 at higher core frequencies or turbo states such as 2.5 GHz, 3.0 GHz, 3.5 GHz, 4.0 GHz or other frequencies. Similarly, control logic 230 can also operate cores 220-227 at higher core frequencies or other frequencies. The maximum core frequency is subject to on-chip limits in temperature, current, and power consumption.

Figure 3:
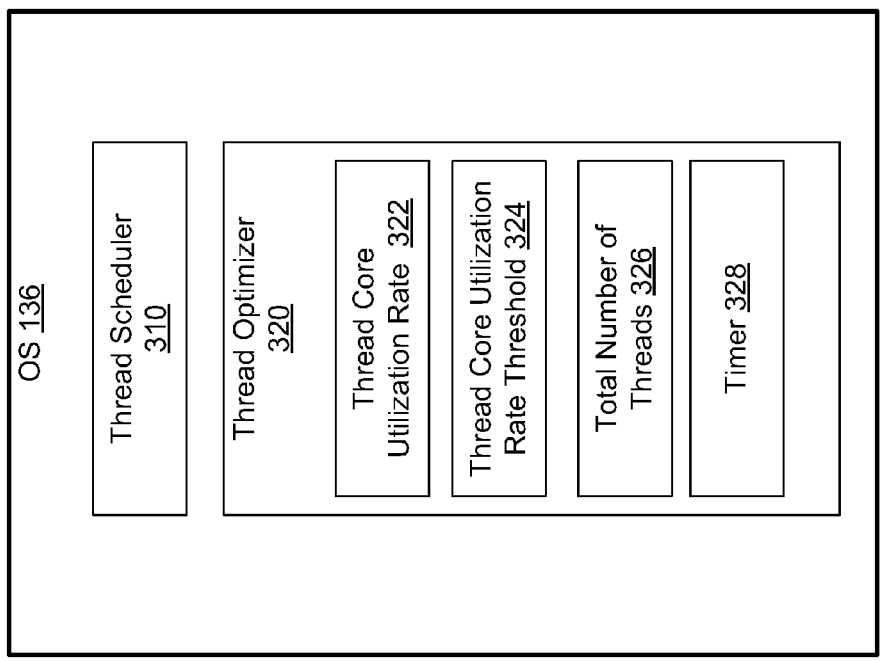
FIG. 3 is a block diagram illustrating functional modules and contents of the operating system, in accordance with one embodiment.

FIG. 3 illustrates further details of operating system 136. Operating system (O/S) 136 manages computer hardware resources and provides common services during operation of IHS 100. The software and/or firmware modules contained within operating system 136 can be loaded into processors 110 and 120 for execution. Operating system 136 includes thread scheduler 310 and thread optimizer 320. Thread scheduler 310 initially assigns threads 131 for execution by cores 200-207 and cores 220-227. Thread optimizer 320 includes software and/or firmware that re-assigns execution of threads 131 that are using large amounts of processor resources, as measured by core utilization rate and labeled as turbo mode threads. While thread optimizer 320 is shown as a separate module from thread scheduler 310, In one or more embodiments, thread optimizer 320 can be incorporated as an integral part of thread scheduler 310. The turbo mode threads can, in certain scenarios, can be re-assigned from an initially assigned primary processor to another processor that is operating at a lower capacity and has available processor resources for execution of the processor intensive turbo mode threads at a higher execution rate or turbo mode state.

Thread optimizer 320 comprises thread core utilization rate 322, thread core utilization rate threshold 324, total number of threads 326, and timer 328. Thread core utilization rate 322 is the amount of core or processor time that each thread is consuming during execution. Thread core utilization rate 322 can be measured in units of time that each thread uses during execution. For example, one thread can take 100 micro-seconds to complete execution on a core operating at 2.0 GHz. Thread core utilization rate threshold 324 is a pre-established maximum value of the thread core utilization rate after which threads are re-assigned to a different processor for execution. The total number of threads 326 is the total number of threads being executed at one time. Timer 328 is used in timing the execution time of each thread.

As described herein, thread scheduler 310 defaults to initially assign threads to cores on first or primary processor 110 (FIG. 1) before assigning threads to second processor 120 (FIG. 1), which can remain idle while only a few threads are being executed on the system to conserve power. Thread optimizer 320 determines a core utilization rate 322 for each of the threads 131 being scheduled and identifies, following initial allocation of a certain number of threads on the first or primary processor 110 (e.g., after 40% core utilization at first processor 110), whether any of the threads being scheduled have a core utilization rate greater than a pre-established core utilization rate threshold 324 (i.e., turbo mode threads or worker threads). In response to identifying a specific thread executing on the first processor having a core utilization rate that is greater than the pre-established core utilization rate threshold, the first processor re-assigns execution of the specific thread from the first processor 110 to one or more of the cores of the second processor 120. The re-assigned thread is able to execute on the second processor at a greater execution rate (i.e., at the turbo mode execution rate) than the pre-established core utilization rate threshold.

According to one aspect of the disclosure, threads 131 are initially assigned for execution by logical processors on first processor 110, while second processor 120 can be kept in a low power state to limit the use of power and reduce heat. In conventional thread scheduling applications, when the number of threads being assigned is greater than the available logical processors on a single socket, the thread scheduler 310 initially assigns the threads to available logical processors of first processor 110 in a round robin fashion before assigning any threads to the second processor 120, as if the logical processors were one large contiguous block. With this conventional approach, an initial assignment of multiple turbo mode threads would go to the first processor 110 until threads begin to be assigned to the second processor 120. When the total number of turbo mode threads (or worker threads) is less than the number of logical processors on a single socket, all the turbo mode threads are assigned to the single socket, resulting in reduced processing throughput due to limitations on the single socket. As described herein, the disclosure provides thread optimizer 320, which is an enhancement to thread scheduling logic that performs the symmetric re-distribution of turbo mode threads among the multiple available sockets, during the initial assignment of the turbo mode threads, to enable higher overall CPU performance.

As more threads execute on the cores of primary processor 110, the maximum execution rate will decrease due to limitations on core performance due to power and heat requirements. The processors have algorithms that decrease the operating frequency of the cores in proportion to the number of busy cores. Thread optimizer 320 identifies computing resource intensive threads or threads requiring turbo mode execution and determines if execution of the turbo mode threads can be more efficiently accomplished on another processor.

Execution of the turbo mode threads is more efficient on a second processor 120, if the primary processor 110 has a number of cores assigned (to execute threads) that falls between a lower threshold number or percentage, $Th_L$ (e.g., 25 percent) and higher threshold number $Th_H$ (e.g., 75 percent) of the total number of cores available in the system (100). In one embodiment, a generalized formula for determining the range of the number of executing threads where thread re-assignment is allowed is given by the following equation:

$$\text{Number of threads where re-assignment is allowed} = TLC/2 +/- TLC/4,$$

where TLC=the total number of logical processor cores in the system.

The above equation can be utilized for total logical processor count, because a single core can have multiple logical processors, such as with Hyperthreading. For example, if a computer system has 16 total logical processor cores, thread optimizer 320 only re-assigns threads for execution when more than 4 threads are executing and less than 12 threads are executing (i.e., when there are between 5 and 11 total threads executing within the system). With this specific example, when less than 25 percent or more than 75 percent of the cores are being utilized on primary processor 110, re-assignment of threads for execution on another processor results in a minimal performance improvement and as such thread optimizer 320 does not re-assign threads.

Figure 4:
FIG. 4 is an example assignment table that identifies the initial socket and/or processor and re-assigned socket and/or processor used to execute each thread, according to one embodiment.

FIG. 4 illustrates an assignment table 400 that identifies the corresponding initial processor and re-assigned processor used to execute each thread. Assignment table 400 includes individual threads 131 (labeled A-H) and a corresponding initial primary processor 410 that is initially assigned by thread scheduler 310 to execute each of the threads. Of the assigned threads, those requiring greater processing frequency (or turbo state operation) are identified with bold font, namely threads C, F and G. Assignment table 400 further includes a re-assigned processor 420 that has been assigned to specific re-assigned threads by thread optimizer 320. For purposes of the description herein, the initial assignment of each thread to a core (or logical processor within a core) of a specific processor is assumed to follow the sequence of rows within assignment table 400. As shown, threads A-C are initially assigned to a primary or first processor (P1) 110 for execution on cores of first processor. For purposes of the description, this initial assignment of threads to three cores are assumed to represent an initial assignment to 37.5% (i.e., less than the threshold 40%) of the eight processors cores available on first processor 110. These threads would be permitted to execute on first processor 110 regardless of the need for turbo mode operation by one or more of these threads because the overall allocation to first processor 110 is below the trigger point established for implementing optimization of the thread allocations. Second processor 120 is thus allowed to remain in the inactive state to conserve power.

However, a next thread assignment of thread D would surpass the 40% threshold and trigger thread optimizer 320 to determine whether the assignment should be to the first processor 110 or the second processor 120 and/or whether to re-assign a particular thread that requires greater processing cycle frequency. As indicated by the table, thread D is assigned to first processor 110; however, thread C, which requires greater processing cycle frequency is re-assigned to second processor (P2) 120 by thread optimizer 320. Thread E, which is not a high utilization rate thread (i.e., does not require greater processing cycle frequency for execution) is assigned to first processor 110. When the next high utilization rate thread, thread F, is encountered, thread optimizer 320 can assign to either the primary or the second processor based on overall usage of each processor. In this implementation, thread optimizer 320 assigns (or causes thread scheduler to assign vis-à-vis thread masking whereby a thread's mask is updated to permit and restrict assignable cores) thread F to second processor 120 rather than first processor 110 even though the first processor has available cores to process thread F. This bypassing of first processor 110 is due to a realization (via computation of processor operating parameters/metrics, such as power utilization, heat generation and cache utilization, etc.) that the first processor cannot support or is not the optimal processor to assign to thread F because of the enhanced processing (increased processing cycles) required by thread F. As one specific example with cache utilization being the parameter of importance, thread optimizer 320 can keep two turbo mode threads which rely heavily upon an L3 cache away from each other and allocate the threads to separate sockets to help maximize the available L3 cache for each turbo mode thread. In this example, assuming a first turbo mode thread scales in performance with the available cache available to the thread, then separating two similar cache-intensive turbo mode threads across sockets or processors can ensure that the two threads do not step on each other's L3 cache and cause a higher cache miss rate.

Notably, as further shown with thread G with assignment table 400, thread optimizer 320 also re-assigns threads from second processor 120 to first processor 110 in situations where thread optimizer 320 determines that first processor 110 is better suited to handle the enhanced processing requirements of the thread (thread G) initially assigned to second processor 120. According to one embodiment, this re-assignment occurs once the number of threads assigned reaches an overall maximum threshold count, e.g., assignment of threads to greater than 75% of cores on first processor 110.

Figure 5:
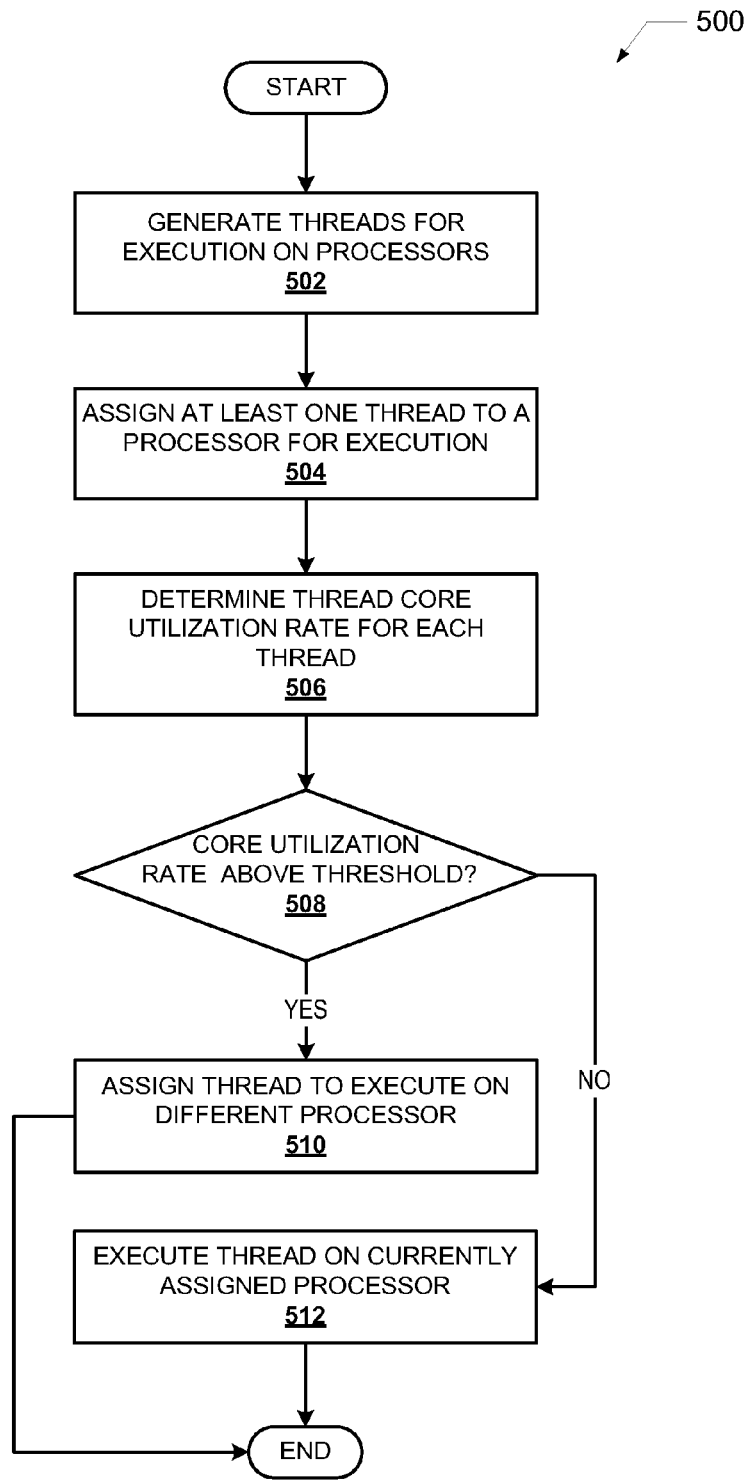
FIG. 5 is a flow chart illustrating one example of the method by which threads are assigned to different sockets and/or processors for execution based on thread core utilization rates, according to one or more embodiments.

FIGS. 5-6 illustrate flowcharts of exemplary methods for (1) improving thread allocation/assignment and overall execution speed within a multi-processor system, (2) enabling the re-assignment of specific threads from one processor to another processor and (3) providing execution of re-assigned threads at a greater execution rate. Generally, methods 500 and 600 represent computer-implemented methods to improve thread execution speed within a multi-processor system and allow certain threads to execute at higher operating frequencies. In the discussion of FIGS. 5-6, reference is also made to components illustrated in FIGS. 1-4. Generally methods 500 and 600 are described as being implemented via control logic 210 and particularly the execution of code provided by thread optimizer 320 acting within control logic 210. It is however appreciated that certain aspects of the described methods may be implemented via other processing devices and/or execution of other code.

Method 500 begins at the start block and proceeds to block 502 at which control logic 210 generates threads for execution on processors 110 and 120. At block 504, control logic 210 initially assigns one or more specific threads to be executed on specific cores of first processor 110. The threads are initially assigned to the first processor 110 and scheduled according to standard thread scheduling. Accordingly, once the cores of first processor 110 have been fully assigned, any additional threads are assigned to cores of second processor 120 for execution. Control logic 210 determines the thread core utilization rate 322 for each of the threads (block 506). In one embodiment, the thread core utilization rate is the percentage of the total available time or clock cycles available for processing threads that a specific thread is utilizing on a core. Control logic 210 determines whether the thread core utilization rate for each of the threads is greater than the pre-established thread core utilization rate threshold 324 (decision block 508).

In response to the thread core utilization rate for a specific thread not being greater than the pre-established thread core utilization rate threshold 324, the thread scheduler 310 provides the thread to the assigned processor and the thread is executed on a core of the currently assigned processor (block 512). Method 500 then ends. In response to the thread core utilization rate for a specific thread being greater than the pre-established thread core utilization rate threshold 324, control logic 210 re-assigns the specific thread to be executed to a core of a different processor, e.g., from first processor 110 to second processor 120 (block 510). Method 500 then ends. When first processor 110 is the primary processor (i.e., the first processor to which the initial allocation of threads are made), if a thread is initially assigned for execution on first processor 110 and the thread core utilization rate for a specific thread is greater than the pre-established thread core utilization rate threshold 324, execution of the thread can be re-assigned from first processor 110 to second processor 120. Similarly, when second processor 120 is the primary processor, if a thread is initially assigned for execution on processor 120 and the thread core utilization rate for a specific thread is greater than the pre-established thread core utilization rate threshold 324, execution of the thread is re-assigned from processor 120 to processor 110.

Method 500 allows a set of instructions or threads that are computing resource intensive to be re-assigned for execution from one first processor that is busy or has a high workload to another second processor that is inactive or has a light workload such that the re-assigned thread is able to execute on the second processor at a greater execution rate (e.g., higher processor cycles per second) than the core utilization rate threshold. In one aspect of the invention, the greater execution rate approaches the maximum allowed processing rate of the processor or the highest clock frequency (turbo state).

Figure 6A:
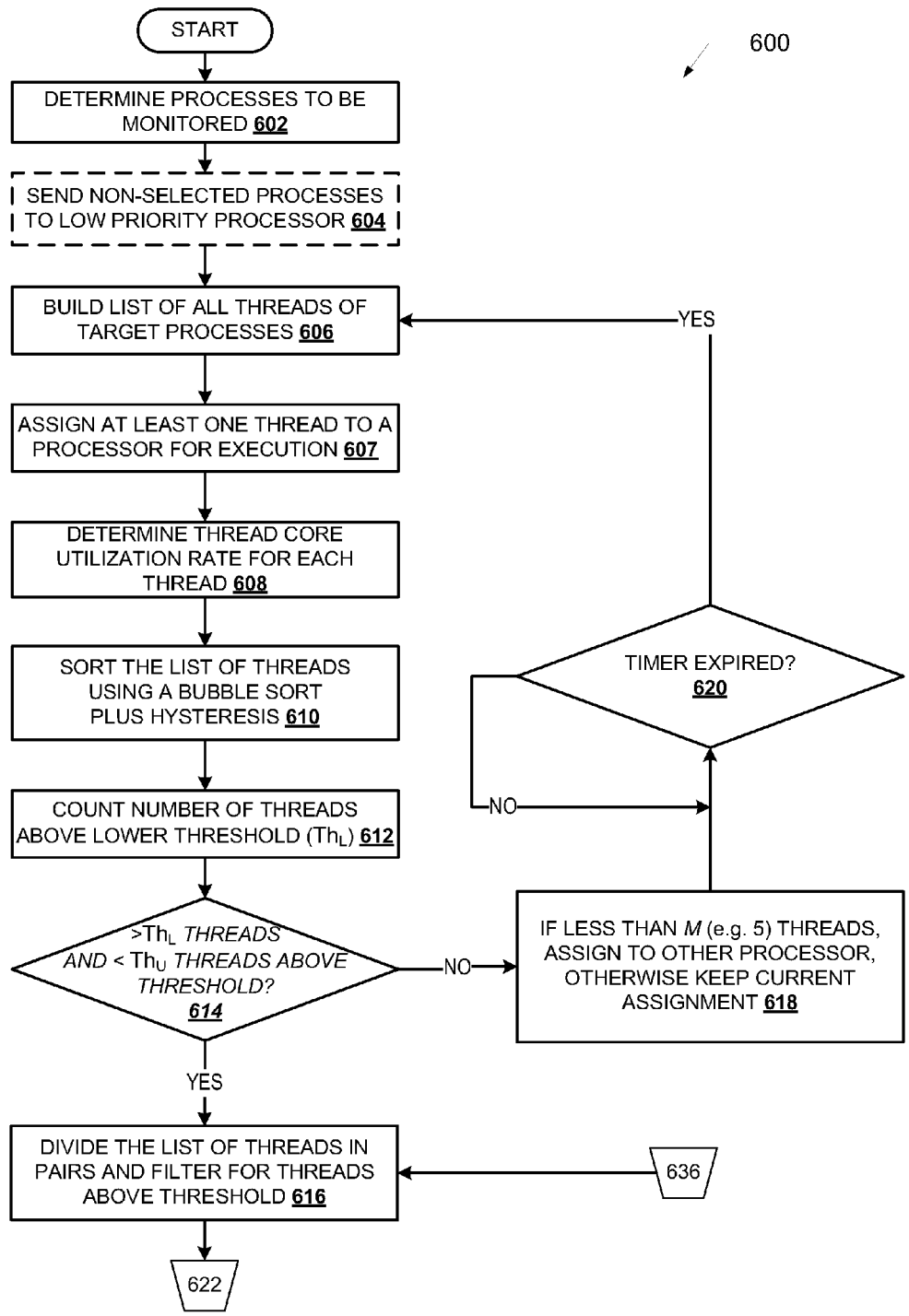
FIG. 6 (6A-6B) is a flow chart illustrating another example of the method by which threads are assigned to different sockets and/or processors for execution based on thread core utilization rates, according to one or more embodiments.
Figure 6B:
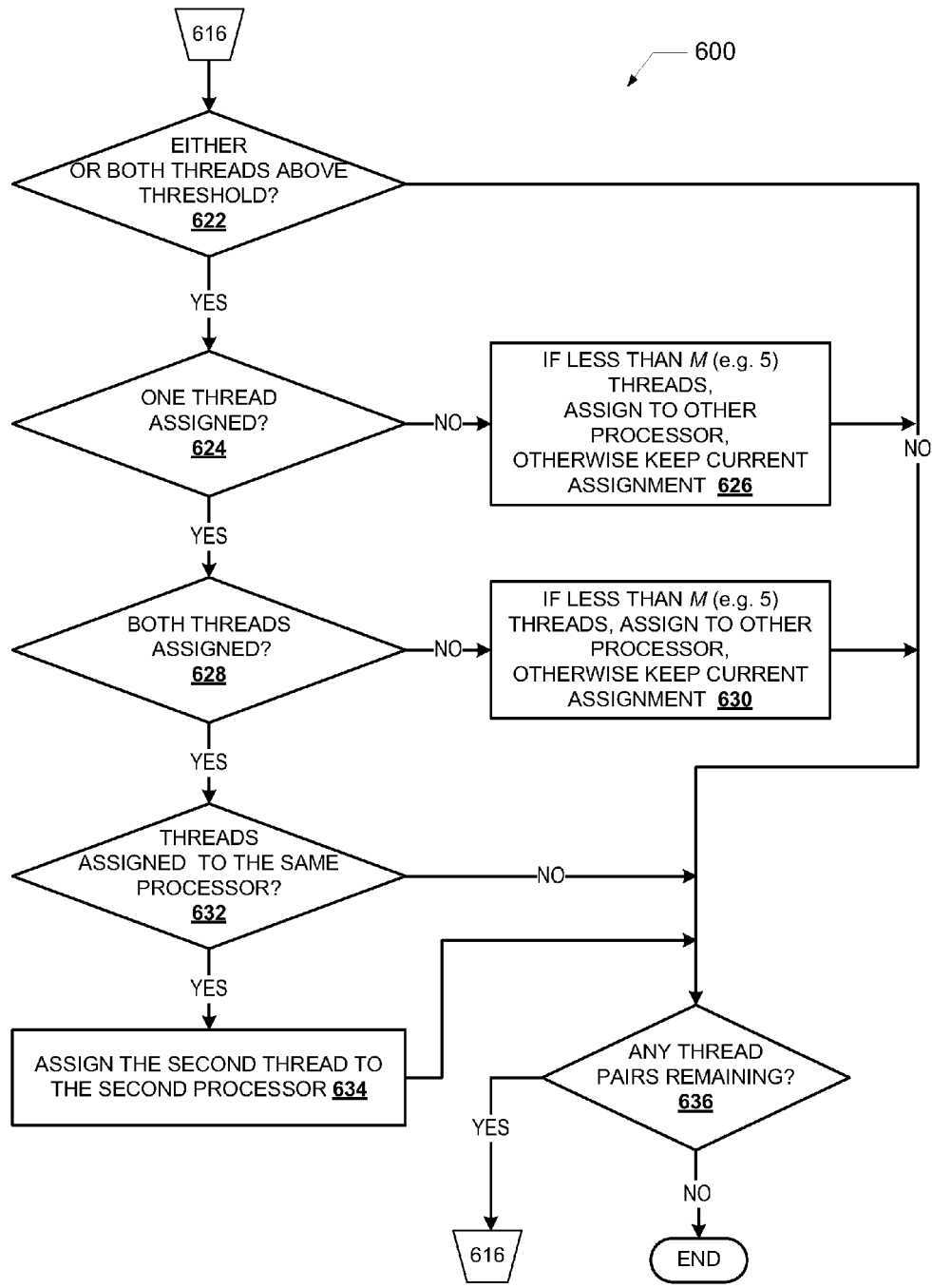

Turning now to FIGS. 6A-6B, a flow chart of method 600 is shown. For purposes of the description of method, two threshold values are provided, a lower threshold number ($Th_L$) and an upper threshold number ($Th_U$), each representing a number of cores that are in use within system. Also, $Th_L$ and $Th_U$ define a range of number of cores being assigned threads for execution thereof, within which range the re-assignment of threads can be advantageously implemented by thread optimizer 320. For purposes of the description of method 600, first processor 110 and second processor 120 each have 8 cores, for a total number of 16 cores in the system. Also, the numerical value of $Th_L$ and $Th_U$ are respectively provided 25% (or 4 cores) and 75% (or 12 cores). It is appreciated that the specific number of processors and number of cores within the system and/or the number or percentage of cores presented as $Th_L$ and $Th_U$ are solely for example and not limiting on the disclosure. Method 600 begins at the start block and proceeds to block 602 at which control logic 210 determines which processes are to be monitored. The processes to be monitored at block 602 can be processes that are computing resource intensive. In an optional block 604, control logic 210 can assign all of the processes that were not selected to be monitored (i.e., processes that use low amounts of computing resources) to a low priority processor. Control logic 210 builds or generates a list of all threads 131 that are included in the targeted monitored processes (block 606). At block 607, control logic 210 assigns one or more specific threads to be executed on specific cores of first processors 110. In one embodiment the set of multiple threads 131 is initially assigned to first processor 110 (as the primary processor) for execution. Control logic 210 determines the thread core utilization rate 322 for each of the threads (block 608). In one embodiment, the thread core utilization rate is the percentage of the total available time or clock cycles available for processing threads that a specific thread is utilizing on a core.

Control logic 210 sorts the list of threads using a bubble sort algorithm into an ordered list of threads from the lowest thread core utilization rate to the highest thread core utilization rates (block 610). The bubble sort algorithm includes a hysteresis factor that prevents threads from being re-assigned in an oscillating manner between different processors. Control logic 210 counts the number of threads that have core utilization rates above or greater than the pre-established thread core utilization rate threshold 324 (block 612). Control logic 210 determines if the number of threads greater than the pre-established thread core utilization rate threshold are between the lower threshold number ($Th_L$) (i.e., more than 4 threads for a system having 16 total cores) and the upper threshold number ($Th_U$), (i.e. less than 12 threads for a system having 16 total cores) of the total number of threads 326 (decision block 614). In response to the number of threads greater than the pre-established thread core utilization rate threshold not being between the lower threshold ($Th_L$) and the upper threshold ($Th_U$) (i.e., 4 threads and 12 threads), control logic 210 assigns one or more of the specific threads having core utilization rates greater than the pre-established thread core utilization rate threshold from an initially assigned first processor 110 to a different second processor 120 for execution, if the number of threads to be assigned is less than a pre-determined number of threads M. Otherwise, control logic 210 keeps the current processor assignment (i.e., first processor 110) for the specific threads (block 618). In an example embodiment with 16 total cores, M can be 5 threads. It is appreciated that the pre-established value of M can be higher or lower in different implementations based on design factors. At decision block 620, control logic 210 determines if timer 328 has expired. In response to the timer expiring, method 600 returns to block 606 where control logic 210 builds or generates a list of all threads 131 that are included in the targeted monitored processes. It is appreciated that the above described processes can be built into and performed by the thread scheduler 310, which would then eliminate the need for monitoring of the processes.

In response to the number of threads greater than the pre-established thread core utilization rate threshold being between the lower threshold ($Th_L$) and the upper threshold ($Th_U$) (4 threads and 12 threads) in decision block 614, control logic 210 divides or organizes the threads into pairs of threads and filters for threads that have core utilization rates above or greater than the pre-established thread core utilization rate threshold 324 (block 616). At decision block 622, control logic 210 determines for each pair of threads if either or both of each specific thread in the pair have core utilization rates above or greater than the pre-established thread core utilization rate threshold 324.

In response to neither of the threads in a pair having core utilization rates above or greater than the pre-established thread core utilization rate threshold 324, control logic 210 determines if any more pairs of threads remain from the sorted list to be assigned to a processor for execution (block 636). In response to no more pairs of threads remaining from the sorted list to be assigned to a processor for execution, method 600 ends. In response to there being at least one pair of threads remaining from the sorted list to be assigned to a processor for execution, method 600 returns to block 616 where control logic 210 divides or organizes the threads into pairs of threads and filters for threads that have core utilization rates above or greater than the pre-established thread core utilization rate threshold 324.

In response to both of the threads in a pair having core utilization rates above or greater than the pre-established thread core utilization rate threshold 324 at block 622, control logic 210 determines if one of the threads in the pair of threads is assigned (i.e., masked) to a processor for execution (block 624). In response to one or both of the threads not being assigned to a processor for execution, control logic 210 assigns each of the threads to a different processor for execution, if the number of threads to be re-assigned is less than the pre-determined number of threads M; otherwise, control logic 210 keeps the current processor assignments for the specific threads (block 626). Control logic 210 determines if any more pairs of threads remain from the sorted list to be assigned to a processor for execution (block 636). In response to no more pairs of threads remaining from the sorted list to be assigned to a processor for execution, method 600 ends. In response to there being at least one pair of threads remaining from the sorted list to be assigned to a processor for execution, method 600 returns to block 616 where control logic 210 divides or organizes the threads into pairs of threads and filters for threads that have core utilization rates above or greater than the pre-established thread core utilization rate threshold 324.

In response to one of the threads being assigned to a processor for execution (block 624), control logic 210 control logic 210 determines if both of the threads in the pair of threads are assigned to a processor for execution (block 628). In response to both of the threads not being assigned to a processor for execution, control logic 210 re-assigns the threads to a different processor for execution, if the number of threads to be re-assigned is less than the pre-determined number of threads M; otherwise, control logic 210 keeps the current processor assignments for the specific threads (block 630). Control logic 210 determines if any more pairs of threads remain from the sorted list to be assigned to a processor for execution (block 636). In response to no more pairs of threads remaining from the sorted list to be assigned to a processor for execution, method 600 ends. In response to there being at least one pair of threads remaining from the sorted list to be assigned to a processor for execution, method 600 returns to block 616 where control logic 210 divides or organizes the threads into pairs of threads and filters for threads that have core utilization rates above or greater than the pre-established thread core utilization rate threshold 324.

In response to both of the threads in the pair of threads being assigned to a processor for execution at block 628, control logic 210 determines if both of the threads in the pair of threads are assigned to the same processor (i.e., processor 110 or processor 120) for execution (decision block 632). In response to both of the threads being assigned to the same processor for execution, control logic 210 re-assigns one of the threads in the pair of threads to a different processor for execution (block 634). Control logic 210 determines if any more pairs of threads remain from the sorted list to be assigned to a processor for execution (decision block 636). In response to no more pairs of threads remaining from the sorted list to be assigned to a processor for execution, method 600 ends. In response to there being at least one pair of threads remaining from the sorted list to be assigned to a processor for execution, method 600 returns to block 616 where control logic 210 divides or organizes the threads into pairs of threads and filters for threads that have core utilization rates above or greater than the pre-established thread core utilization rate threshold 324.

Referring to FIG. 7A, an initial assignment 710 of cores within a multi-processor system utilized to execute threads is shown. The initial assignment of threads for execution to specific cores is performed by thread scheduler 310. In FIG. 7A, cores that are actively engaged in the execution of assigned threads are indicated by dashed lines and cores that are idle are indicated by solid lines. In first processor 110, core 0 200, core 1 201, core 4 204 and core 5 205, have all been initially assigned threads for execution and are active. The remaining cores of first processor 110 are idle and all of the cores of processor 120 are idle. As a result of this assignment of threads and execution by adjacent cores of the same processor, the maximum execution rate of the threads are limited by power and heat consumption considerations of the processor. In one embodiment, core 0 200, core 1 201, core 4 204 and core 5 205 are limited to a maximum execution rate of 3.0 GHz.

Referring to FIG. 7B, a re-assignment 720 of processors within a multi-processor system utilized to execute threads is shown. In one embodiment, the re-assignment of processors is performed according to method 500 or method 600. The re-assignment of threads for execution to specific cores is performed by thread optimizer 320. In FIG. 7B, cores that are actively engaged in the execution of assigned threads are indicated by dashed lines and cores that are idle are indicated by solid lines. In first processor 110, core 0 200 and core 4 204 are executing initially assigned threads and are active. The remaining cores of first processor 110 are idle. In second processor 120, core 0 220 and core 4 224 have been re-assigned threads to execute that were initially assigned for execution to first processor 110. Core 0 220 and core 4 224 are executing re-assigned threads and are active. The remaining cores of second processor 120 are idle. The re-assignment of threads and execution by fewer cores of a processor enables the maximum execution rate of the threads to increase toward the maximum performance limits of the processor. In one embodiment, after threads have been re-assigned, core 0 200 and core 4 204 of first processor 110 can execute threads at a rate of 3.5 GHz and core 0 220 and core 4 224 of second processor 120 can execute threads at a rate of 3.5 GHz.

In the above described flow charts, one or more of the methods may be embodied in a computer readable medium containing computer readable code such that a series of functional processes are performed when the computer readable code is executed on a computing device. In some implementations, certain steps of the methods are combined, performed simultaneously or in a different order, or perhaps omitted, without deviating from the scope of the disclosure. Thus, while the method blocks are described and illustrated in a particular sequence, use of a specific sequence of functional processes represented by the blocks is not meant to imply any limitations on the disclosure. Changes may be made with regards to the sequence of processes without departing from the scope of the present disclosure. Use of a particular sequence is therefore, not to be taken in a limiting sense, and the scope of the present disclosure is defined only by the appended claims.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. Computer program code for carrying out operations for aspects of the present disclosure may be written in any combination of one or more programming languages, including an object oriented programming language, without limitation. These computer program instructions may be provided to a processor of a general purpose computer, special purpose computer, such as a service processor, or other programmable data processing apparatus to produce a machine, such that the instructions, which execute via the processor of the computer or other programmable data processing apparatus, performs the method for implementing the functions/acts specified in the flowchart and/or block diagram block or blocks.

One or more of the embodiments of the disclosure described can be implementable, at least in part, using a software-controlled programmable processing device, such as a microprocessor, digital signal processor or other processing device, data processing apparatus or system. Thus, it is appreciated that a computer program for configuring a programmable device, apparatus or system to implement the foregoing described methods is envisaged as an aspect of the present disclosure. The computer program may be embodied as source code or undergo compilation for implementation on a processing device, apparatus, or system. Suitably, the computer program is stored on a carrier device in machine or device readable form, for example in solid-state memory, magnetic memory such as disk or tape, optically or magneto-optically readable memory such as compact disk or digital versatile disk, flash memory, etc. The processing device, apparatus or system utilizes the program or a part thereof to configure the processing device, apparatus, or system for operation.

As will be further appreciated, the processes in embodiments of the present disclosure may be implemented using any combination of software, firmware or hardware. Accordingly, aspects of the present disclosure may take the form of an entirely hardware embodiment or an embodiment combining software (including firmware, resident software, micro-code, etc.) and hardware aspects that may all generally be referred to herein as a "circuit," "module," or "system." Furthermore, aspects of the present disclosure may take the form of a computer program product embodied in one or more computer readable storage device(s) having computer readable program code embodied thereon. Any combination of one or more computer readable storage device(s) may be utilized. The computer readable storage device may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage device would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage device may be any tangible medium that can contain, or store a program for use by or in connection with an instruction execution system, apparatus, or device.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular system, device or component thereof to the teachings of the disclosure without departing from the essential scope thereof. Therefore, it is intended that the disclosure not be limited to the particular embodiments disclosed for carrying out this disclosure, but that the disclosure will include all embodiments falling within the scope of the appended claims.

Moreover, the use of the terms first, second, etc. do not denote any order or importance, but rather the terms first, second, etc. are used to distinguish one element from another.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

What is claimed is:

1. A computer-implemented method of improving thread execution speed within a multi-processor system, the method comprising:

generating a plurality of threads to schedule for execution on a plurality of processors of the multi-processor system, the plurality of processors including at least a first processor and a second processor, each processor having a plurality of individual cores;

initially assigning at least one thread to the first processor for execution on a core of the first processor;

determining a core utilization rate for each of the other threads being scheduled;

identifying whether any of the other threads being scheduled for execution on the first processor has a core utilization rate greater than a pre-established core utilization rate threshold;

in response to identifying a specific other thread assigned to the first processor having a core utilization rate that is greater than the pre-established core utilization rate threshold, re-assigning execution of the specific other thread from the first processor to the second processor, whereby the re-assigned other thread is able to execute on the second processor at a greater execution rate than the pre-established core utilization rate threshold;

counting a total number of threads that have core utilization rates above or greater than the pre-established thread core utilization rate threshold;

determining if the counted number of threads are less than a lower threshold number or greater than an upper threshold number; and in response to the counted number of threads being less than the lower threshold number or greater than the upper threshold number and not being less than a predetermined number of threads, maintaining a current processor assignments for the threads.

2. The method of claim 1, further comprising:

sorting each pair of the other threads that have a core utilization rate greater than the pre-established core utilization rate threshold into pairs of a first thread and a second thread;

determining whether a specific processor has been pre-assigned to execute each of the first thread and the second thread of a pair; and in response to neither of the first thread and the second thread being pre-assigned to execute on a specific one of the plurality of processors, assigning the first thread to execute on the first processor and assigning the second thread to execute on the second processor.

3. The method of claim 1, further comprising:

sorting the other threads that have a core utilization rate greater than the pre-established core utilization rate threshold into pairs of a first thread and a second thread;

determining whether a specific one of the processors has been assigned to execute each of the first thread and the second thread; and in response to the first thread being assigned to execute on the first processor and the second thread not being assigned to execute on a specific one of the processors, assigning the second thread to execute on the second processor.

4. The method of claim 1, further comprising:

sorting the threads that have a core utilization rate greater than the pre-established core utilization rate threshold into pairs of a first thread and a second thread;

determining the processor assigned to execute each of the first thread and the second thread; and in response to both the first and second threads being initially assigned to execute on the first processor, re-assigning the second thread to execute on the second processor.

5. The method of claim 1, further comprising:

identifying at least one high priority process and at least one low priority process;

generating a first set of a low priority threads associated with the low priority process and a second set of high priority threads associated with the high priority process; and assigning execution of the low priority threads to the first processor.

6. The method of claim 1, further comprising:

ranking the threads based on the core utilization rate of each thread;

in response to the counted number of threads being greater than the lower threshold number and less than the upper threshold number:
 arranging the threads having core utilization rates above the pre-established core utilization rate threshold into pairs of a first thread and a second thread; and
 assigning execution of each of the first and second threads of each pair of threads to a different processor.

7. The method of claim 6, further comprising:

in response to the counted number of threads being less than a pre-determined number of threads, assigning the threads above the pre-established core utilization rate threshold to execute on the first processor.

8. The method of claim 1, further comprising:

tracking, via a timer, an elapsed time since a last thread count has been completed to identify threads being executed above the pre-established core utilization rate threshold;

in response to expiration of the timer, re-counting the number of threads remaining above the pre-established core utilization rate threshold; and in response to identifying, via the re-counting, that there are additional threads above the pre-established core utilization rate threshold, restarting the timer to track a next elapsed time.

9. The method of claim 1, further comprising:

ranking the threads based on the core utilization rate of each thread, wherein ranking the threads further comprises sorting the threads based on increasing core utilization rates into an ordered set of threads from a lowest core utilization rate to a highest core utilization rate.

10. The method of claim 1, further comprising:

in response to the counted number of threads being less than the lower threshold number or greater than the upper threshold number and being less than the predetermined number of threads, assigning one or more of the specific other threads having core utilization rates greater than the pre-established thread core utilization rate threshold from an initially assigned first processor to a different second processor for execution.

11. An information handling system (IHS) comprising:

a multi-processor system including a plurality of processors, each of the processors having a plurality of cores;

a memory coupled to the processors via a system interconnect;

a first processor having firmware executing thereon to improve thread execution speed within the multi-processor system, wherein the firmware configures the first processor to:

generate a plurality of threads to schedule for execution on the processors;

initially assign at least one thread to a first processor for execution on a core of the first processor;

determine a core utilization rate for each of the other threads being scheduled;

identify whether any of the other threads being scheduled for execution on the first processor has a core utilization rate greater than a pre-established core utilization rate threshold;

in response to identifying a specific thread scheduled for execution on the first processor as having a core utilization rate that is greater than the pre-established core utilization rate threshold, re-assign execution of the specific thread from the first processor to the second processor, whereby the re-assigned thread is able to execute on the second processor at a greater execution rate than the pre-established core utilization rate threshold;

count a total number of threads that have core utilization rates above or greater than the pre-established thread core utilization rate threshold;

determine if the counted number of threads are less than a lower threshold number and greater than an upper threshold number; and in response to the counted number of threads being less than the lower threshold number or greater than the upper threshold number and not being less than a predetermined number of threads, maintain a current processor assignments for the threads.

12. The information handling system of claim 11, wherein the firmware further configures the first processor to:

sort the other threads that have a core utilization rate greater than the pre-established core utilization rate threshold into pairs of a first thread and a second thread;

determine whether a specific processor has been pre-assigned to execute each of the first thread and the second thread in a pair; and in response to neither of the first thread and the second thread being pre-assigned to execute on a specific one of the processors, assign the first thread to execute on the first processor and assign the second thread to execute on the second processor.

13. The information handling system of claim 11, wherein the firmware further configures the first processor to:
   sort the other threads that have a core utilization rate greater than the pre-established core utilization rate threshold into pairs of a first thread and a second thread;
   determine whether a specific one of the processors has been assigned to execute each of the first thread and the second thread in a pair; and
   in response to the first thread being assigned to execute on the first processor and the second thread not being assigned to execute on a specific one of the processors, assign the second thread to execute on the second processor.

14. The information handling system of claim 11, wherein the firmware further configures the first processor to:
   sort the other threads that have a core utilization rate greater than the pre-established core utilization rate threshold into pairs of a first thread and a second thread;
   determine the processor assigned to execute each of the first thread and the second thread; and
   in response to both the first and second threads being initially assigned to execute on the first processor, re-assign the second thread to execute on the second processor.

15. The information handling system of claim 11, wherein the firmware further configures the first processor to:
   identify at least one high priority process and at least one low priority process;
   generate a first set of a low priority threads associated with the low priority process and a second set of high priority threads associated with the high priority process;
   assign execution of the low priority threads to the first processor.

16. The information handling system of claim 11, wherein the firmware further configures the first processor to:
   rank the threads based on the core utilization rate of each thread; and
   in response to the counted number of threads being greater than the lower threshold and less than the upper threshold:
     arrange the threads having core utilization rates above the pre-established core utilization rate threshold into pairs of a first thread and a second thread; and
     assign execution of each of the first and second threads of each pair of threads to a different processor.

17. The information handling system of claim 16, wherein the firmware further configures the first processor to:
   in response to the counted number of threads being less than a pre-determined number of threads, assign the threads above the pre-established core utilization rate threshold to execute on the first processor.

18. The information handling system of claim 16, further comprising a timer, wherein the firmware further configures the first processor to:
   track, via the timer, an elapsed time since a count of the number of threads has been completed to identify threads being executed above the pre-established core utilization rate threshold;
   in response to expiration of the timer, re-count the number of threads above the pre-established core utilization rate threshold; and
   in response to the re-count identifying that there are additional threads above the pre-established core utilization rate threshold, restart the timer to track a next elapsed time.

19. The information handling system of claim 16, wherein the firmware further configures the first processor to:
   sort the threads based on increasing core utilization rates into an ordered set of threads from a lowest core utilization rate to a highest core utilization rate.

20. The information handling system of claim 11, wherein the firmware further configures the first processor to:
   in response to the counted number of threads being less than the lower threshold number or greater than the upper threshold number and being less than the predetermined number of threads, assigning one or more of the specific other threads having core utilization rates greater than the pre-established thread core utilization rate threshold from an initially assigned first processor to a different second processor for execution.

* * * * *